United States Patent [19]

Rachlin

[11] Patent Number: 5,268,876
[45] Date of Patent: Dec. 7, 1993

[54] METHOD OF ESTIMATING NEAR FIELD ABERRATING DELAYS

[75] Inventor: Daniel J. Rachlin, Palo Alto, Calif.

[73] Assignee: The Board of Trustees of the Leland Stanford Junior University, Stanford, Calif.

[21] Appl. No.: 721,339

[22] Filed: Jun. 25, 1991

[51] Int. Cl.⁵ ............................................. G03B 42/06
[52] U.S. Cl. ........................................ 367/7; 367/11; 128/661.01
[58] Field of Search ...................... 367/7, 11, 103, 105; 128/661.01; 73/609

[56] References Cited

PUBLICATIONS

Rachlin, "Direct estimation of aberrating delays in pulse-echo imaging systems," J. Acout. Sco. Am. 88 (1), Jul. 1990.

Primary Examiner—Daniel T. Pihulic
Attorney, Agent, or Firm—Townsend and Townsend Khourie and Crew

[57] ABSTRACT

A method to quantify the distortions caused by near filed variations in the propagation medium of pulse echo imaging systems. By estimating the phase lags induced by the aberrator at each point on the aperture, appropriate electronic delays might be applied to the signals associated with each array element in order to restore the system to focus. The method is capable of estimating the set of aberrating delays in an imaging phased array by using appropriate data from a single two or three dimensional pulse echo scan.

12 Claims, 5 Drawing Sheets (RECEIVING MODE)

METHOD OF ESTIMATING NEAR FIELD ABERRATING DELAYS

BACKGROUND OF THE INVENTION

This invention relates generally to ultrasound imaging, and more particularly the invention relates to a method of estimating near field aberrating delays in pulse echo imaging systems.

In almost any practical pulse-echo imaging system which utilizes phased arrays, the imaging system impulse response tends to widen in the presence of near filed propagation inhomogeneities. In the case of medical acoustic imaging, focusing errors in high-performance systems are primarily a result of inhomogeneities in the near-field propagation medium.

A fair amount of prior art exists on the subject of correcting for near field distortions in diffraction limited phased array systems. The most direct approach involves imaging a target which can be modeled as a single isolated point scatterer. Following the transmission of a pulse from the entire aperture, the signals obtained by each receiver element are virtually identical, apart from a relative lag imparted by aberrating delays. The relative delays between two signals can be estimated by determining the peak in their cross-correlation function. Refinements in this approach to cover moving targets which contain a large point source corrupted by smaller sources have been developed for imaging with radar, B. D. Steinberg, "Microwave imaging of aircraft," Proc. IEEE 76(2), 1578-1592 (1988). In acoustic imaging Flax and O'Donnell have had success in applying the cross-correlation technique while imaging targets composed of diffuse random scatterers, S. W. Fax and M. O'Donnell, "Phase-aberration correction using signals from point reflectors and diffuse scatterers: basic principles," IEEE Trans. Ultrason. Ferroelectr. Freq. Control UFFC-35(6), 758-767 (1988).

Muller's and Buffington's work in optics spawned a number of iterative approaches which use a sharpening function as a criterion for image quality, R. A. Muller and A. Buffington, "Real-time correction of atmospherically degraded telescope images through image sharpening," J. Opt. Soc. Am. 64(9), 1200-1210 (1974). They proposed several classes of sharpening functions, all of which are expressible as integrals whose integrals whose integrands are a function of the image intensity. The sharpening functions are maximized in the absence of focusing aberrations. The investigations of Muller and Buffington centered on incoherent stellar imaging. Gamboa has adapted these approaches to ultrasonic imaging, A. Gamboa, "Ultrasonic imaging through an inhomogeneous medium with a linear phased array," Ph.D. thesis, Stanford University, Department of Electrical Engineering, 1988. His algorithms rely on the presence of a dominant reflector or "glint" in the domain of the sharpening function integral.

In other recent work, Nock et al. have demonstrated success in acoustic imaging when using a sharpness function represented as the integral of the backscatter magnitude of the image data, L. Nock, G. E. Trahey, and S. W. Smith, "Phase aberration correction in medical ultrasound using speckle brightness as a quality factor," J. Acoust. Soc. Am. 85, 1819-1833 (1989). The patented approach generally does not rely on the presence of a dominant reflector, and has demonstrated some success in prototype.

Synthetic aperture techniques have evolved which compensate for near field aberrations. As an example, Hirama et al. recognized that both a phase aberrator and target distribution could be reconstructed from the full set of data acquired by separately transmitting and receiving with each element in an acoustic phased array, M. Hirama and T. Sato, "Imaging through an inhomogeneous layer by least-mean-square error fitting," J. Acoust. Soc. Am. 75, 1142-1147 (1984). They did not develop an approach to cover targets which extend in range, and they did not propose a means of acquiring the information from a single scan.

SUMMARY OF THE INVENTION

This invention is directed to correcting near field propagation inhomogeneities and other sources of focusing aberrations which can be modeled as a fixed delay screen superimposed upon an array aperture. By accurately estimating the time lags imparted to the signal radiating from and received by each element of the array, it is a straightforward matter to bring the system to full focus by applying compensating delays to the transmitter and receiver electrical signals. Whereas the algorithm used in the invention will be described in the context of acoustic imaging, it is readily transferrable to other forms of pulse-echo phased array imaging.

The invention offers a number of advantages. By using a spatial frequency domain approach, data are readily obtainable which enable the unknown aberrating delays to be obtained from a linear system of equations. A narrow band version of the approach can be implemented, allowing for reduced complexity and fast computational algorithms. By acquiring additional data, the linear system of equations can overspecify the unknowns. This redundancy can be used as a means to enhance one's certainty of the estimates by verifying the consistency of the set of equations. In so doing, it is possible to minimize any possibility calculating estimates of a delay profile that will tend to worsen, rather than improve the quality of focus. The analytical properties of this invention are readily derived, allowing for greater ease in predicting its performance, as well as in finding ways to optimize it.

The invention and objects and features thereof will be more readily apparent from the following description and appended claims when taken with the drawings.

DETAILED DESCRIPTION OF ILLUSTRATIVE EMBODIMENTS

Figure 1:
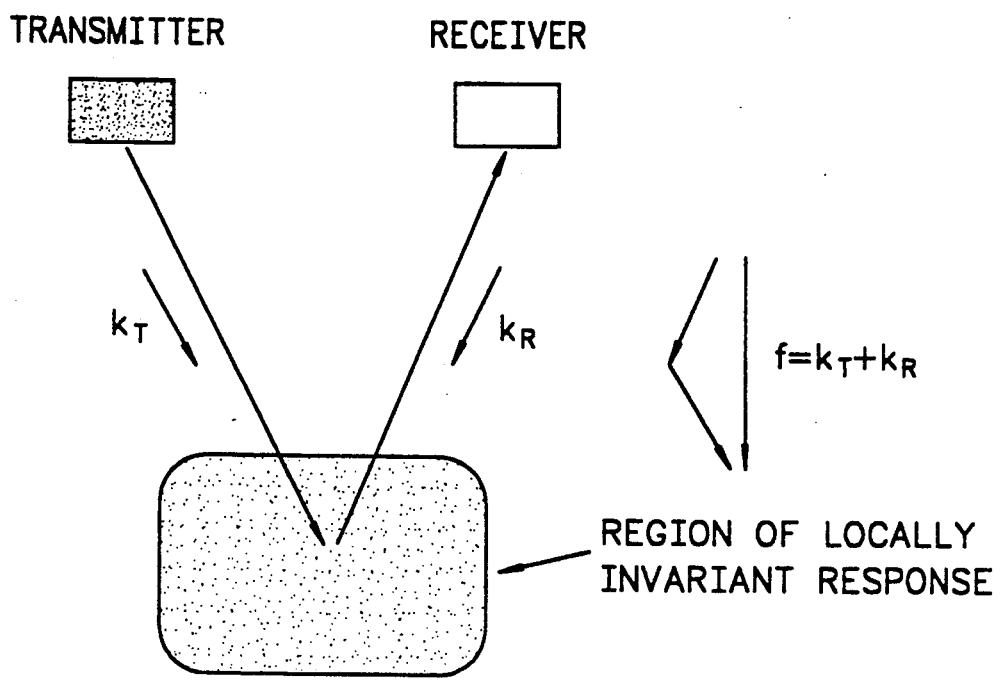
FIG. 1 depicts an imaging system comprising a single point transmitter and receiver, insonifying a compact target. This system detects a single spatial frequency distribution of scatters, $f=(f_y, f_z)$ where $f_y$ is determined using (1) and (4).

In developing the theory underlying the invention, consider the simple case of an imaging system comprising a point transmitter and point receiver element a finite distance apart, as depicted in FIG. 1. The target is assumed to be small and compact, so that the spatial frequency response of this system is zero everywhere except for $$f = (f_y, f_z) = k_n + k_{n'},\qquad(1)$$

where $f_y$ and $f_z$ are the lateral and axial spatial frequencies respectively, corresponding to the lateral and range variables y and z, and the vector wavenumbers of (approximately) planar waves arising from each source in the small neighborhood of the target are given by $k_n$ and $k_{n'}$. Note that lateral translation of the target region away from the reference centerline results in a rotation and reduction in magnitude of f. It is assumed that both of these effects are negligible throughout the region corresponding to the image of the target.

Figure 2:
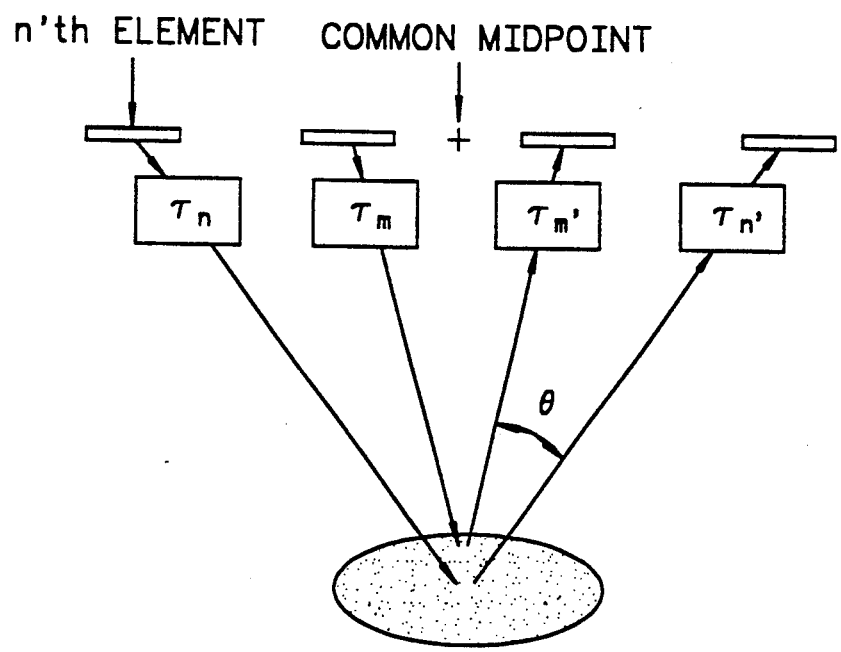
FIG. 2 depicts two pairs of transmitter-receiver elements with common midpoints. Element pairs n-n' and m-m' have similar spatial frequency response, provided angles $\alpha_1$ and $\alpha_2$ are small.

A four element subset of a linear array is depicted in FIG. 2. The transmitters separately emit identical signals, apart from an unknown relative time delay which accounts for any arrival time differences at the target. Let $g_{n,n'}(t)$ represent the analytic signal acquired by the simple system consisting of the nth transmitter and the n'th receiver elements, and define s(y, t) S($f_y$, f) as the target scatterer distribution. The transmitter and receiver element midpoints are located at $y=y_n$ and $y=y_{n'}$ respectively. From geometric considerations introduced earlier, or equivalently by noting that the lateral frequency response of a pulse-echo imaging system is found from a convolution of the transmit and receive aperture transmittance functions (which include the effects of aberrations), two pairs of transmitter-receivers indexed by (m, m') and (n, n') will have the same two-dimensional frequency response support provided:

$$m + m' = n + n'\qquad(2)$$

The relative phase of each frequency response is solely a function of the temporal frequency and the aberrating delay profile. The validity of (2) rests on a type of paraxial approximation, which in the situation depicted in FIG. 2 is satisfied provided $\theta$ is small.

The Fourier transform of the signal from the n–n' pair yields a single line of three-dimensional frequency domain data:

$$G(f;n,n') = H(F_y,f;n,n')S(f_y,f),\qquad(3)$$

where $H(f_y,f;n,n')$ represents the system frequency response and $$f_y = \frac{f \cdot (y_n + y_{n'})}{cZ}\qquad(4)$$

$$f \epsilon \left[ F_c - \frac{B}{2}, F_c + \frac{B}{2} \right],$$

where $F_c$ is the center frequency, and B represents the full bandwidth.

It is very common to refer to the distorting aberrations as "phase aberations." We will define the phase aberration $\phi$ as $$\phi = [2\pi F_c \tau]_{2\pi},\qquad(5)$$

where $\tau$ represents an aberrating delay, and the $2\pi$ subscript indicates modulo $2\pi$.

The complete set of discrete Fourier transformed data can be represented as $$\begin{aligned}G(f;n,n') &= |G(f;n,n')|e^{j\angle G(f;n,n')}\\ &= |H(f;n,n')||S(f;n+n')|e^{j2\pi f(\tau_n+\tau_{n'})}e^{\angle S(f;n+n')}\end{aligned}\qquad(6)$$

where $\tau_n = \tau(y_n)$, $\tau(y)$ being the one-way aberrating delay from the combined effects of all sources, including instrument timing errors and propagation medium inhomogeneities. Let the transmit and receive delays imparted to each element be the same, i.e. $\tau_n = \tau_{n'}$ for $n = n'$. This assumption is generally valid insofar as acoustic wave propagation is concerned, but might not hold with respect to the dynamics of the instrument electronics. Rather than account for two unknown delays per element, let it be assumed that any asymmetric delays imparted by the instrument electronics are fully known and compensated.

Equation (7) factors into two equations separately concerning magnitudes and phases:

$$|G(f;n,n')| = |H(f;n,n')||S(f;n+n')|\qquad(7)$$

and $$\angle G(f;n,n') = 2\pi f(\tau_n + \tau_{n'}) + \angle S(f;n+n'),\qquad(8)$$

the second of which will be of further interest.

By assumption, interchanging the roles of transmitter and receiver creates no change in the phase of the received signal. By eliminating the $\{\angle S(f; n+n')\}$ in the set of equations represented in (8), the following relations are obtained:

$$[2\pi f(\tau_n - \tau_m - \tau_{m'} + \tau_{n'})]_{2\pi} = \angle G(f;n,n') - \angle G(f;m,m') \text{ for } n+n'=m+m'.\qquad(9)$$

The set of possible equations available using transmitter-receiver element pairs in fully sampled arrays contains a high degree of redundancy, enabling many equations to be excluded.

Define an intermediate set of delays, $$t_{m,m',n,n'} = \tau_n - \tau_m - \tau_{m'} + \tau_{n'},\qquad(10)$$

so that (9) becomes $$[2\pi f t_{m,m',n,n'}]_{2\pi} = \angle G(f;n,n') - \angle G(f;m,m').\qquad(11)$$

It is well known that $t_{m,m',n,n'}$ can be estimated by determining the time delay which maximizes the magnitude of the cross-correlation function estimate:

$$R_{n,n',m,m'}(\Delta t) = \frac{1}{J} \sum_j g(t;n,n')g^*(t+\Delta t;m,m').\qquad(12)$$

If the signals are sufficiently narrowband, then we must speak in terms of phases rather than time delays. In this case, fast correlation techniques can be applied which result in greatly reduced arithmetic complexity.

As was discussed above, there exists the possibility that known and differing aberrations will be present on the transmit and receive apertures. Specifically, these constitute deviations in the applied set of focusing delays from ideal sets of delays. Let $$\delta_{T,n} = \tau_n + \partial_{T,n} - r_n/c, \quad (13)$$

or $$\delta_{T,n} = \tau_n + \tau_{T,n,applied}, \quad (14)$$

where $\delta_{T,n}$ is the total deviation of the transmitting element's delay from true focus at range $r_n$ (see FIG. 4) and accounts for both the medium imposed aberration $\tau_n$, and the deviation of the applied delays $\partial_{T,n}$ from the ideal $r_n/c$. Rather than solve separately for the transmit and receive $\delta_{T,n}$ and $\delta_{R,n}$ respectively, we shall absorb the applied aberration term (which is known apriori) into the our definition of $t_{m,m',n,n'}$ in (10), so that $$t_{m,m',n,n'} \leftarrow t_{m,m',n,n'} - \tau_{T,n,applied} - \tau_{T,n',applied} + \tau_{T,m,applied} + \tau_{T,m',applied}. \quad (15)$$

To avoid excessive notation, in the following it shall be assumed that the known aberrating delays have been subtracted from each of the quantities $t_{m,m',n,n'}$. Consequently, the algorithm for estimating the propogation aberrating delays can be used even when, for example, the region of interest is away from the transmit focus.

Let $\{t_{m,m',n,n'}\}$ be reindexed by $l \in [1,L]$, $T=[t_1 \ldots t_L]^T$, and $\tau = [\tau_1 \ldots \tau_N]^T$, so that $$T = A\tau \quad (16)$$

is the matrix version of (10), where A is an L by N matrix.

Observe that for odd N $$\tau' = \tau + C_0\tau_0 + C_1\tau_1 \quad (17)$$

will be a solution of (16) for arbitrary $C_0$ and $C_1$ provided $$\tau_0 = [1 \ldots 1]^T \quad (18)$$

$$\tau_1 = \left[ -\frac{N-1}{2} \ldots 0 \ldots \frac{N-1}{2} \right]^T,$$

which, allowing for minor changes in notation, holds for cases involving an even number of elements.

The row null space of A is spanned by $\tau_0$ and $\tau_1$, which represent aggregate axial and steering delays respectively. Applying arbitrary linear combinations of these delays to the transmitted and received wavefronts results in axial and lateral translations of the image data. The maximum rank of A is $N-2$, so that the row space of A is the space spanned by those combinations of delays which yield distortions in the shape of the system impulse response. As a general rule, compensating delays can be calculated to yield an undistorted response, but the resulting image may be linearly translated some unknown amount from its correct position.

Equation (16) is an overdetermined linear system of equations, whose rank is $N-2$. Because its rank is less than N, two constraints can arbitrarily be imposed in a variety of ways. One approach which has notational simplicity is to set the delays at each end of $\tau$ vector to 0, and solve for the remaining delays, $$T = A_r T_r \quad (19)$$

$$T_r = \begin{bmatrix} \tau_2 \\ \cdot \\ \cdot \\ \cdot \\ \tau_{N-1} \end{bmatrix}^T, A_r = [A_{,2} \ldots A_{,N-1}],$$

using the pseudoinverse, $$\tau_r = (A_r^T A_r)^{-1} A_r^T T. \quad (20)$$

In (19) $A_{,n}$ is the nth column vector of A. The constraint on the ends of the aperture can be converted to the constraint that the delay profile add no net axial or lateral shift:

$$\tau \leftarrow \tau - (\tau_0^T \tau)\tau_0 - (\tau_1^T \tau)\tau_1. \quad (21)$$

Up until now, a synthetic aperture approach has been described which places undue conditions on the target and which requires that elements be fired individually, a situation which is highly impractical in most cases. Assume that a complete two-dimensional scan is acquired of a small compact target and that the complex data $g(y,t;n')$ from every receiver element are available. The two-dimensional Fourier transform of the data from the n'th receiver becomes $$G(f_y,f;n') = H(f_y,f;n')S(f_y,f). \quad (22)$$

From linearity, the lateral frequency response is derived in the same manner as if the data were obtained from a series of transmit pulses from individual elements, i.e.

$$H(f_y,f;n') = |H(f_y,f;n')|e^{j2\pi f(\tau n' + \tau n)}, \quad (23)$$

which holds provided the condition expressed by (4) is satisfied. Therefore, $$G(f_y,f;n') = |H(f_y,f;n')| |S(f_y,f)| e^{j2\pi f(\tau n' + \tau n)} e^{j\angle S(f_y,f)}. \quad (24)$$

By letting $G(f_j;n,n')$ denote $G(f_y,f_j;n,n')$ when $f_y$ is given by (4), the representation of the algorithm presented in the synthetic aperture context remains appropriate, with $g(t_j;n,n')$ derived from an inverse Fourier transform of a line of two-dimensional frequency domain data.

Note that the spatial localization of the imaging system response, as provided by the use of the full aperture, allows for the possibility of the target to extend in space. The finite extent of the scan region now substitutes for the boundedness of the target. As is described in this section, this finite extent induces certain performance limitations on the algorithm. The treatment is mainly heuristic but serves to illustrate the essential issues; analytic refinements are available by making assumptions about the nature of the scatterer distribution (e.g. a combination of a fully imaged compact target and a stationary speckle-generating scatterer distribution).

Let $$g(y,t) = w(y,t)(h(y,t)*_{y,t}f(y,t)) \approx h(y,t)*_{y,t}f(y,t). \quad (25)$$

where $w(y,t)$ is a sufficiently wide window function of finite support. Fourier transforming, $$G(f_y,f;n') = e^{j2\pi f(\tau_n + \tau_{n'})} \cdot W(f_y,f)^* {}_{f_y,f} (|H(f_y,f;n')| S(f_y,f) e^{j2\pi f \tau_n(\Delta y)}), \quad (26)$$

where from (4)

$$\Delta y = cf^{-1} Z f_y - y_n - y_{n'}, \quad (27)$$

and $$\tau_n(\Delta y) = \tau(y_n + \Delta y) - \tau(y_n). \quad (28)$$

Let real and symmetric $w(y,t) = w_y(y) w_t(t)$ be chosen so that $W_y(f_y)$ is real and symmetric and is confined about the frequency origin. For example, $w_y(y)$ may be a Hamming window. If the lateral extent of the scanned region is $L_y$ then $L_y^{-1}$ represents a measure of the lateral width of $W_y(f_y)$. Consequently, if $$|2\pi f \tau_n(\Delta y)| < < \pi/2 \text{ for } |\Delta y| < \frac{cZ}{L_y f} \approx \frac{\lambda}{\Theta_s} \quad (29)$$

then $$G(f_y,f;n') \approx e^{j2\pi f(\tau_n + \tau_{n'})} \cdot W(f_y,f)^* {}_{f_y,f} (|H(f_y,f;n')| S(f_y,f))$$

$$\approx e^{j2\pi f(\tau_n + \tau_{n'})} \cdot |H(f_y,f;n')| \cdot W(f_y,f)^* {}_{f_y} S(f_y,f).$$

In (29) $\Theta_s$ is the angular extent of the scan in radians and $\lambda$ is the wavelength corresponding to the center temporal frequency. The second approximation is based upon the local smoothness properties of $|H(f_y,f;n')|$ over lateral frequency intervals of magnitude $1/L_y$, and requires minor modifications if the elements are near the end of the aperture. Based on (30), the analysis of the previous sections requires the substitution to be introduced:

$$S(f_y,f) \leftarrow W(f_y,f)^* {}_{f_y} S(f_y,f). \quad (31)$$

Given the presumed arbitrariness of $S(f_y,f)$, (31) should not suggest any alterations in the basic algorithm. However, the extent of the scan angle required to generate reliable data is determined by the level of fluctuations in the aberrating delay profile.

An analogous situation exists when imaging a compact target. In this case full resolution of the delay profile, down to the wavelength limit, is achievable if the target is fully scanned. (Fourier components of the aberrating screen with period less than a wavelength emit vanishing evanescent waves). Since the lateral bandwidth of the system is limited, the full image of any target has infinite extent. For practical situations almost all the energy of a target can be captured by using a scan window which extends beyond the target borders by some small multiple of a sensible measure of the imaging system point-spread function width. It is to be expected that both wide excursions and short correlation distances in aberrating delay profiles contribute to a widening in beamwidth. More precise conclusions can be drawn by assuming that the arrays are subject to random aberrating delay profiles which are modeled as ergodic Gaussian processes. In this case the average intensity impulse response can be found directly from the second order statistics of the aperture transmittance function. The ensemble average intensity impulse response width is inversely proportional to the correlation width of the delay screen transmittance function, provided this latter quantity is small compared to the width of the apertures.

Figure 3:
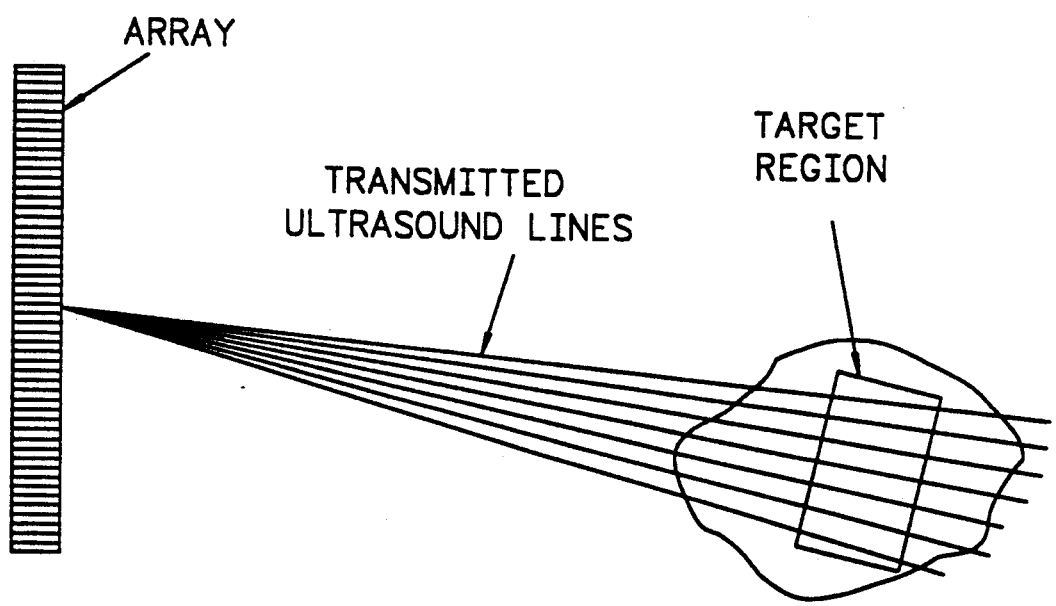
FIG. 3 shows a rectangular target region superimposed upon which are the scan lines which represent the trajectories of the transmitter beams.

It is best to refer to FIG. 3 at the outset, in order to define the assumed scan geometry. For simplicity, the target is assumed small enough that the assumption of parallel scan lines and locally invariant impulse response holds. Each scan line is indexed by $j = 1 \ldots J$, and is obtained as the trajectory of the relevant transmitted beam. Other indices used are $n = 1 \ldots N$ or $m = 1 \ldots N$ for the transmitter elements, $n' = 1 \ldots N$ or $m' = 1 \ldots N$ for the receiver elements and $i = 1 \ldots I$ for the sampled time $t_i = z_i * 2/c$ values. All ranges of $t_i$ and $j$ define points within the target region. It is assumed that the scan lines sufficiently sample the received image space, i.e. that the scan lines are sufficiently narrow as compared to the width of a focused beam.

Figure 4:
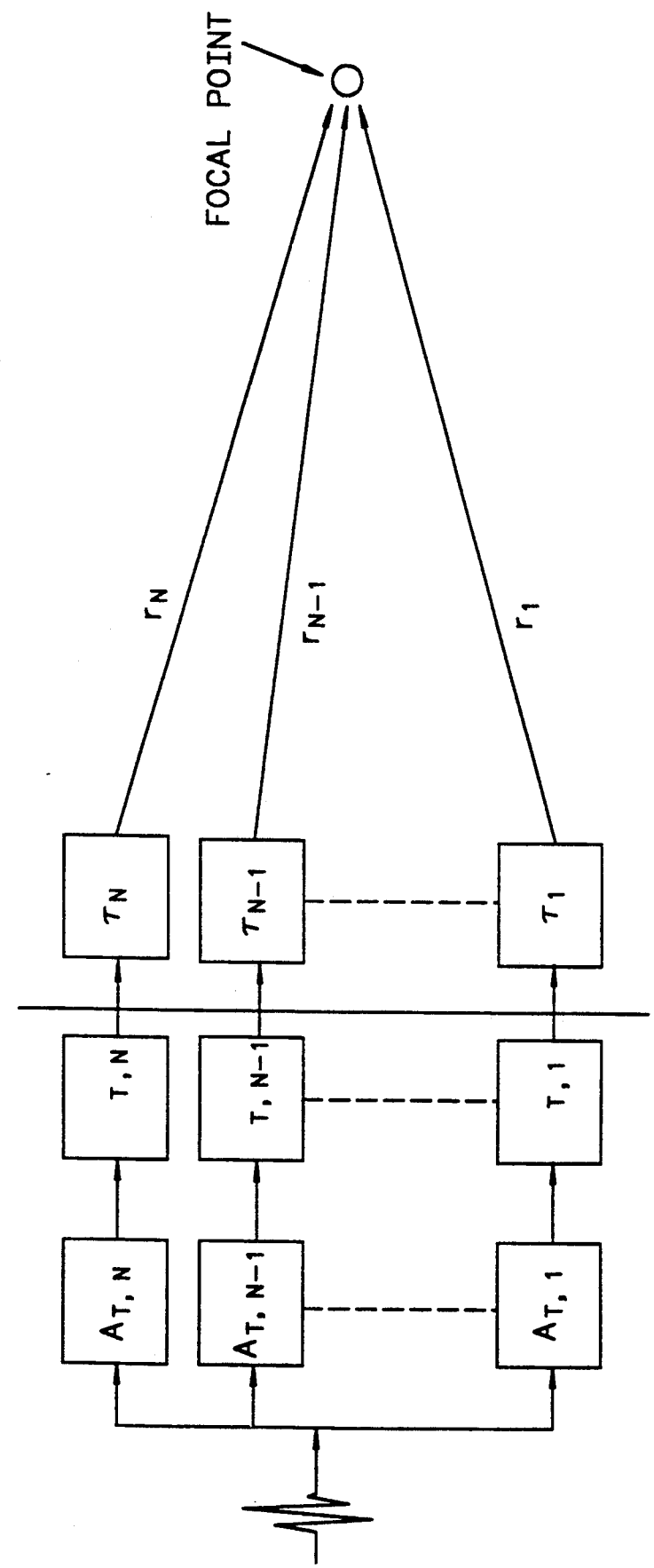
FIG. 4 depicts a simplified schematic of a transmit subsystem, including the effects of aberrations.

Referring to FIG. 4, an electrical excitation signal is applied to each transmitting element of a phased array. A delay, $\partial_{T,n}$ and complex apodization $A_{T,n}$ are applied to each electrical input signal. Each element converts the electrical excitation signal to an acoustic signal, which propagates outward from the array, and has temporal bandwidth $B_w$ and center frequency $F_c$. The acoustic signal emerging from each element undergoes an additional delay, $\tau_n$, imposed by aberrations in the medium, so that the full effective delay is $\delta_{T,n} = \tau_n + \partial_{T,n} - r_n/c$. where $r_n$ is the distance from the n'th element to the field point. It should be recognized that were it possible to set $\partial_n = -r_n/c - \tau_n$, that the effects of all aberrations would be canceled, and the transmit beam would be focused at the point of interest.

Figure 5:
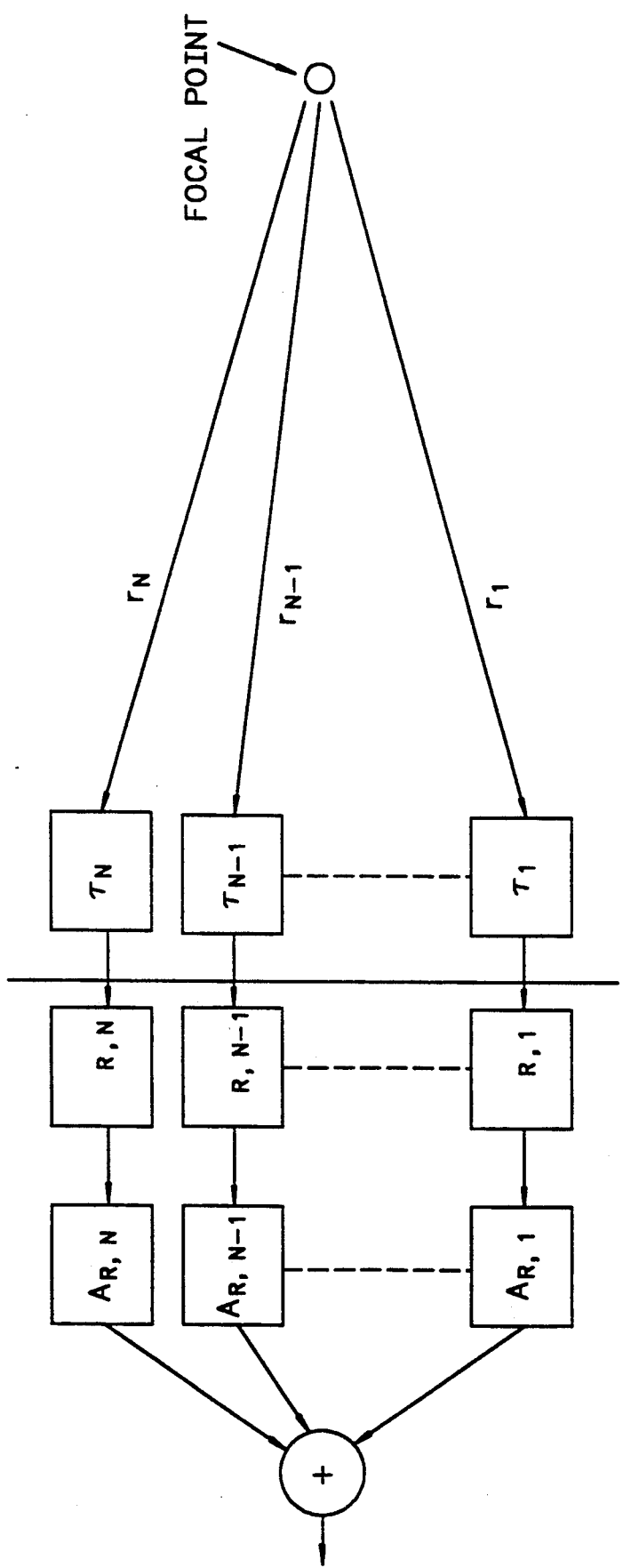
FIG. 5 depicts a simplified schematic of a receive subsystem, including the effects of aberrations.

The receive beamforming, depicted in FIG. 5, reverses many of the steps in transmit beamforming. A single reflected signal from the point of interest travels as a spherical wave back toward the aberrating layer to each receiver element, which converts the acoustic signal into an electrical signal. Whereas much of the receiver electronics can be analog, we shall assume that digital sampling, as well as baseband in phase and quadrature detection, is performed on each electronic signal arising from each element, so that the zero frequency component now corresponds to $F_c$ in the original signal. The delays $\partial_{R,n}$ and complex apodization $A_{R,n}$ are imparted to each electrical signal $g_{i,n'}(t_j)$ prior to their summation to produce $g_i(t_j)$.

As noted earlier, an assumption of a narrowband signal can reduce the computational complexity of the algorithm. A narrowband signal can be produced by transmitting a narrowband signal, or by filtering the received signal. Ordinarily, relatively wideband pulses are used for imaging, and one objective of this algorithm is to take advantage of data acquired in the normal course of scanning. The first approach involves an approach which uses the signal at the discrete quantized frequency $F_c$, which as mentioned earlier corresponds to $f = 0$ for the baseband inphase and quadrature signal. We form $$g_{n,n'}(t_j) = \sum_i W_{i,n,n'} g_{i,n'}(t_j), \quad (32)$$

where $W_{i,n,n'}$ is the appropriate Fourier weighting to sift out the interaction between the $n$ and $n'$ transmitter and receiver respectively. If $g_{n'}(t_j)$ still had a center frequency of $F_c$, we would find the phase angle of the $F_c$ Fourier component as $\angle G_{n,n'}(F_c)$, but since $g_{n,n'}(t_j)$ is baseband, we are interested in $\angle G_{n,n'}(0)$. The algorithm requires that this be added to $-\angle G_{m,m'}(F_c)$ for some appropriate m, m'. However, $$G_{n,n'}(0) = \Sigma_j g_{n,n'}(t_j) \text{ or } G_{n,n'}(0) = \Sigma_i W_{i,n,n'} \left[ \sum_j g_{i,n'}(t_j) \right]. \quad (33)$$

In other words, if we define $g_{i,n'} \equiv [\Sigma_j g_{i,n'}(t_j)]$, then these N·I single complex quantities form intermediate inputs to the algorithm.

As a typical example, an array might be subdivided into N=32 segments over which the phase aberrator estimate is sampled, and the scan region might consist of I=10 lines. Consequently, there are formed a total of 320 individual $g_{i,n'}$. The N separate $g_{i,n'}$ are computed during the acquisition of the i'th scan line. Referring to the L equations of (16), we note that 2L $G_{n,n'}(0)$ must be calculated, where 2L>4N−4. Form $$G_{n,n'}(0) = \sum_i W_{i,n,n'} \cdot g_{i,n'}, \quad (34)$$

i.e. as the inner product of two I-dimensional vectors. It is clear that each $G_{n,n'}(0)$ can be calculated during the acquisition of the scan, so that in this approach after each scan line i is acquired, appropriate $W_{i,n,n'} \cdot g_{i,n'}$ are calculated and added to one of 2L random access memory (RAM) accumulators, whose sum is $G_{n,n'}(0)$. A total of 2L of these operations must be performed per scan line, each of which involves one complex multiply and one complex addition. These operations are performed by a single central processer unit (CPU), using available RAM, along with the appropriate signal data and stored constants. In our example, to overdetermine the equations in (16) by a factor of two, approximately L=32*8=256 of these weighted additions must be performed during the acquisition of a scan line. Equation (16) and subsequent steps can be used to convert the $t_l = (\angle G_{n,n'}(0) - \angle G_{m,m'}(0))/(2\pi F_c)$ estimates into estimates of the aberrating delays $T_n$. Note that the matrix $A_r^T A_r)^{-1} A_r^T$ can be precomputed.

A second approach recognizes that better signal to noise ratio (SNR) can be obtained by including more frequency components in the received signal, but at the expense of increased complexity. Assume that a bandpass filter is applied to each receiver signal, so that it is mixed down to a narrowband signal $g_{i,n'}(t_j)$ with center frequency f=0. In this case, it is assumed that the signal is still slowly varying, but the phase difference between $g_{n,n'}(t_j)$ and $g_{m,m'}(t_j)$ is relatively constant.

In contrast to the previous approach, it is necessary to form a time dependent signal $$g_{i,n,n'}(t_j) = \Sigma W_{j,n,n'} g_{i,n'}(t_j), \quad (35)$$

and store each accumulated J-dimensional vector in memory, to which is added the subsequent $g_{i+1,n,n'}(t_j)$ vector etc. Corresponding to each scan line are now a total of JL complex multiplying and JL complex summing operations, assumed again to be mediated by a CPU with access to RAM and the appropriate data quantities and constants. Note that J need not necessarily be the original sampling interval, since the signal has now been narrowband filtered. Because the envelope of each $g_{i,n,n'}(t_j)$ is slowly varying (with respect to the delays imparted by the aberrations), the quantity $\angle g_{n,n'}(t_j) - \angle g_{n,n'}(t_j)$ represents a valid estimate of $2\pi F_c(\tau_{n,n'} - \tau_{m,m'})$. Each $\angle g_{n,n'}(t_j) - \angle g_{n,n'}(t_j)$ can be formed as $\angle g_{n,n'}(t_j)/g_{m,m'}(t_j)$ or as $\angle g_{n,n'}(t_j)g^*_{m,m'}(t_j)$ so that, for example, $$2\pi F_c(\tau_{n,n'} - \tau_{m,m'}) = \angle \sum_j g_{n,n'}(t_j)/g_{m,m'}(t_j). \quad (36)$$

Subsequent steps are identical with those of the previous approach. It should be noted that hybrids of the two approaches are readily obtainable, but that for extremely wideband signals, where one might expect $$B_w \gtrsim 1/\tau_n, \quad (37)$$

a full temporal crosscorrelation would be necessary.

The next set of approaches address the conversion of the intermediate delay (or associated phase) estimates T to the aberrating delay vector T. One wishes to avoid estimates which are inconsistent, since such inconsistencies imply some breakdown in the application of the algorithm and applying corrections based upon poor estimates might worsen the focal quality of the imaging system.

Using either of the first two approaches, it is possible to take advantage of the redundancy to determine the degree of consistency between the T vector estimate and the T vector. Let $B = (A_r^T A_r)^{-1} A_r^T$, so that a mean squared error is obtained as $$MSE = (\tau - BT)(\tau - BT)^T. \quad (38)$$

A large amount of error implies inconsistent equations, possibly due to an aliasing effect in converting a phase angle to a time value. Embodiment 3 involves using this mean-squared-error factor as a measure of the quality of the estimates.

Consistency can also be ascertained by running one or more parallel duplicates of the algorithm, using different transmitter-receiver pairs, but estimating the same set of $\tau_n$. This fourth approach significantly increases the computational and data acquisition complexity of the algorithm.

There are three issues which motivate the fifth approach, the first of which, consistency between the elements of T and $\tau$, has been discussed above. Another significant issue involves aliasing of the $\{t_i\}$ estimates. In the narrowband algorithms for determining the intermediate delay estimates (e.g. approaches 1 and 2), there is a $2n\pi$ ambiguity in specifying the phase which corresponds to each $\{t_i\}$, where n is an integer, yet it is a phase, and not the actual temporal value, which is being estimated in a narrowband algorithm. Assuming the aberrating delay profile is continuous, then using elements which are sufficiently close together to form the each $\{t_i\}$ implies that we might safely assume $$-\pi < 2\pi^c t_i < \pi \quad (39)$$

However, if only closely neighboring elements are used to construct each $\{t_i\}$, then small random errors involved in determining each $\{t_i\}$ will become compounded when estimating the more slowly varying components of the aberrating profile. If an aberrating profile is slowly varying then it is desirable to use widely spaced elements to form each $\{t_i\}$, but then there is a risk of aliasing. In general, it cannot be ascertained beforehand whether the aberrating profile is slowly varying or not, and it might be expected to be the summation of both quickly and slowly varying components, as might be reflected in a Fourier decomposition of the aberrating delay profile. Using exclusively widely spaced elements in generating $\{t_i\}$ may yield an undersampled estimate of the profile. This approach involves the simultaneous use of both widely and closely spaced elements to form the set of $\{t_i\}$. For example, the two endmost aberrating delays might be fixed arbitrarily to some value, say zero for each. The third delay is computed using $$\tau_2 = t_{0,1,1,2} - \tau_0 + 2\tau_1 = t_{0,1,1,2}, \qquad (40)$$

where elements 0,1,2 are assumed closely spaced enough so that (39) holds. Further delays would be calculated similarly, until say $$\tau_9 = t_{7,8,8,9} - \tau_7 + 2\tau_8, \qquad (41)$$

or perhaps $$\tau_9 = t_{1,5,5,9} - \tau_1 + 2\tau_5. \qquad (42)$$

It may be expected that in many situations estimating $\tau_9$ using the second of these might result in a $2\pi c F_c$ ambiguity, whereas reliance on the first equation alone might propagate errors of the sort mentioned above. The first equation can be used to eliminate the $2\pi c F_c$ ambiguity in estimating $\tau_9$, so that the second equation might be invoked as a strong condition in the linear system of equations (16). A simple approach involves multiplying each of the equations in (16) by a weighting factor $\rho_l$. Let R represent the diagonal L by L matrix whose l'th diagonal term is $\rho_l$. Then, for example, (16) becomes $$RT = RA\tau, \qquad (43)$$

and (20) becomes $$\tau_r = R_r^{-1}(A_r^T A_r)^{-1} A_r^T R_r T, \qquad (44)$$

where $R_r$ is constructed from R in a manner analogous to the construction of $A_r$ from A.

Extensions: Separate transmit and receive delays can be accounted for simply by representing the unknown delays explicitly, and acquiring sufficient data (at least twice as much as for the case where they are assumed equal).

Delays over 2 dimensional arrays can again be determined simply by extending the spatial domain to a third dimension, and acquiring sufficient data to solve for all sets of unknowns. The same principle of using pairs of elements with common midpoints applies.

I claim:

1. A method of estimating near-field aberrating delays in a pulse echo imaging system having an array of transmitting and receiving elements comprising the steps of obtaining signals from a plurality of transmitter-receiver element pairs, determining the interaction phase between specific transmitter and receiver element pairs, obtaining a measure of an intermediate set of delays associated with two different pairs of transmitter and receiver elements by subtracting measured interaction phase of said two different pairs of transmitter and receiver elements, establishing a matrix of said measured of intermediate sets of delays as defining system means field aberrating delays, and determining a set of system delays by obtaining the pseudomatrix inverse of said matrix.

2. The method as defined by claim 1 wherein the interactive phase between elements (n,n') for frequency fj is $\angle G(fj;n,n')$, the interactive phase between elements (m,m') for frequency (fj) is $\angle G(fj;n,n')$, the aberrating delay associated with elements m,m',n,n' is $\tau m, \tau m', \tau n, \tau n'$ respectively, and $$[2\pi f_j(\tau_n - \tau_m - \tau_{m'} + \tau_{n'})]_{2\pi} = \angle G(fj;n,n') - \angle G(fj;m,m') \text{ for } n+n' = m+m'.$$

3. The method as defined by claim 2 wherein said matrix is defined by $$T = A\ T$$

where
$T = [\tau_1 \ldots \tau_N]^T$
$A = L$ by N matrix
$T = [t_1 \ldots t_L]^T$.

4. The method as defined by claim 3 wherein delays at each end of vector are set to 0, and solving for the remaining delays $$T = A_\tau\ T_\tau\ T = A_r T_r$$

using the pseudoinverse $T_r = \begin{bmatrix} \tau_2 \\ . \\ . \\ . \\ \tau_{N-1} \end{bmatrix}^T, A_r = [A_{,2} \ldots A_{,N-1}],$ $T_r = (A_r^T A_r)^{-1} A_r^T T.$ 5. The method as defined by claim 4 wherein said signals are wideband and the electrical signals $g_{n,n'}(t_j)$ are defined as $$g_{n,n'}(t_j) = \sum_i W_{i,n,n'} g_{i,n'}(t_j),$$

where $W_{i,n,n'}$ is the appropriate Fourier weighting to sift out the interaction between the n and n' transmitter and receiver, respectively.

6. The method as define by claim 5 wherein the degree of consistency between the T vector estimate and the T vector is determined by letting $$B = (A_\tau^T A_\tau)^{-1} A_\tau^T$$

and obtaining a means squared error as $(T - BT)(T - BT)^T$.

7. The method as defined by claim 4 wherein said signals are wideband and a plurality of narrow band signals $g_{i,n'}(t_j)$ are obtained from each signal, and a time dependent signal $g_{i,n,n'}(t_j)$ is defined as $g_{i,n,n'}(t_j) = \Sigma W_{j,n,n'} g_{i,n'}(t_j)$.

8. The method as define by claim 7 wherein the degree of consistency between the T vector estimate and the T vector is determined by letting $$B = (A_\tau^T A_\tau)^{-1} A_\tau^T$$

and obtaining a means squared error as $(T - BT)(T - BT)^T$.

9. The method as define by claim 1 wherein different transmitter-receiver pairs are utilized in parallel duplicate algorithms for estimating the same set $\tau_n$.

10. The method as defined by claim 1 wherein the transmit aberrating delay and receive aberrating delay for each element are equal.

11. The method as defined by claim 1 wherein the transmit aberrating delay and receive aberrating delay for each element are unequal.

12. The method as defined by claim 1 wherein said array of transmitting elements is two dimensional and said set of system delays cover three dimensional scanning space.

* * * * *

UNITED STATES PATENT AND TRADEMARK OFFICE
CERTIFICATE OF CORRECTION

PATENT NO. : 5,268,876

DATED : December 7, 1993

INVENTOR(S) : DANIEL J. RACHLIN

It is certified that error appears in the above-identified patent and that said Letters Patent is hereby corrected as shown below:

On the title page, after the title, insert the following paragraph on line 4.

--This invention was made with Government support under contract No. CA38109 awarded by the National Institutes of Health. The Government has certain rights in this invention.--

Signed and Sealed this

Thirteenth Day of December, 1994

Attest:

BRUCE LEHMAN

*Attesting Officer*  *Commissioner of Patents and Trademarks*